United States Patent [19]

Imazaike

[11] Patent Number: 4,583,138
[45] Date of Patent: Apr. 15, 1986

[54] DEVICE FOR TRANSPORTING CASSETTE

[76] Inventor: Mikiharu Imazaike, 11-B-420, Nishi 1-chome, Tezukayama, Sumiyoshi-ku, Osaka, Japan

[21] Appl. No.: 482,733

[22] Filed: Apr. 6, 1983

[30] Foreign Application Priority Data

Apr. 12, 1982 [JP] Japan .................................. 57-61245
Apr. 15, 1982 [JP] Japan .................................. 57-63328

[51] Int. Cl.$^4$ ........................ G11B 5/027; G11B 17/00
[52] U.S. Cl. ..................................... 360/85; 360/96.5
[58] Field of Search ............................ 360/96.5, 85, 95

[56] References Cited

U.S. PATENT DOCUMENTS 4,320,424 3/1982 Murayama ............................. 360/85
4,361,859 11/1982 Schatteman ........................ 360/96.5

Primary Examiner—A. J. Heinz
Attorney, Agent, or Firm—Jordan and Hamburg

[57] ABSTRACT

A cassette transporting device adapted to receive on a cassette support a cassette inserted through an inlet in the front side of the main body of a video tape recorder or like magnetic record reproducing apparatus, to move the cassette support along a cassette frame horizontally rearward and then vertically downward to an operative position and to return the support to the loading position for the ejection of the cassette by reversely moving the support. The device comprises guide means for guiding the support along the path of the movement, and drive means having a motor for driving the support. The guide means has a stationary guide groove formed in each of opposite side walls of the frame and including a horizontal groove portion and a vertical groove portion, a movable guide member fitted in the horizontal groove portion and slidable only along the horizontal groove portion, and a guided projection formed on each of the support side walls and guidable by the guide groove and the guide member. The guide projection, guide groove and guide member coact to move the support stably and smoothly bring the support from horizontal movement into vertical movement and vice versa. The main assembly of the drive means is provided on only one side of the frame to simultaneously transmit its drive force to the opposite sides of the support through a coupling rod supported by the side walls of the support, moving members on both ends of the rod and moving member guide paths on the frame side walls.

6 Claims, 8 Drawing Figures

DEVICE FOR TRANSPORTING CASSETTE

BACKGROUND OF THE INVENTION

The present invention relates to a device for use in a video tape recorder or like magnetic record reproducing apparatus for transporting a cassette between a loading position and an operative position.

As a cassette loading-unloading system for video tape recorders and like magnetic record reproducing apparatus, recently in use is a cassette front loading-unloading system which has a cassette inlet in a front portion of the main body of the reproducing apparatus and a cassette support adapted to receive a cassette inserted from the inlet and movable along a cassette frame horizontally rearward and then vertically downward to an operative position. For the ejection of the cassette, the cassette support is moved reversely to return the cassette to the loading position. The transporting device of this type of cassette loading-unloading system comprises guide means for guiding the cassette support along the abovementioned path, and drive means including a motor serving as a drive source for moving the cassette. However, the cassette transporting device has the following drawbacks.

The guide means generally comprises a guide member having a horizontal groove and vertically movably provided on each of opposite side walls of the cassette frame, and a projecting guided portion formed on each of opposite side walls of the cassette support and slidably fitted in the horizontal groove in the guide member. The cassette support is moved horizontally and vertically by moving the guided portion horizontally along the horizontal groove and then moving the guide member downward. The guide means nevertheless has a fundamental drawback; since the area of contact between the guided portion and the guide member is small, the engagement therebetween invariably involves a backlash, so that the cassette support is liable to tilt or deflect sidewise during horizontal travel, hence unstable movement. The guide member is made vertically movable along a vertical groove formed in the side wall of the cassette frame by a pin externally projecting from the guide member and loosely fitted in the vertical groove. Accordingly the engagement of the pin in the vertical groove also involves a backlash, which renders the vertical movement of the cassette support also unstable.

On the other hand, the drive means comprises exactly identical drive gear assemblies respectively provided externally on opposite side walls of the cassette frame and interconnected by a power transmission shaft extending between the side walls of the cassette frame. The shaft is driven by a motor at one side to simultaneously drive the two drive assemblies and to thereby move the opposite sides of the cassette support at the same time. However, with this arrangement wherein the two drive assemblies must be disposed on opposite sides of the cassette frame, the drive means in its entirety is complex in construction, costly in respect of component parts and assembly and is further inefficient to assemble. Moreover, the two drive assemblies are not always accurately operable in synchronism due to differences in precision or improper operation of one of the assemblies, resulting in the likelihood that the cassette support will not move properly.

SUMMARY OF THE INVENTION

A first object of the present invention, overcoming the drawbacks of the conventional device, is to provide a device for transporting a cassette from a loading position to an operative position and vice versa at all times without tilting, sidewise deflection or backlash during horizontal and vertical movement.

A second object of the present invention is to provide a cassette transporting device in which the main mechanism of drive means is provided on only one side of a cassette frame and which is therefore simple in construction and lower in the costs of components and assembly.

A third object of the present invention is to provide a cassette transporting device in which opposite sides of the cassette support are movable accurately in synchronism although the support is adapted to be driven at one side as stated above.

Other objects and advantages of the present invention will become apparent from the following description of embodiment with reference to the accompanying drawings.

DETAILED DESCRIPTION OF THE INVENTION

Figure 1:
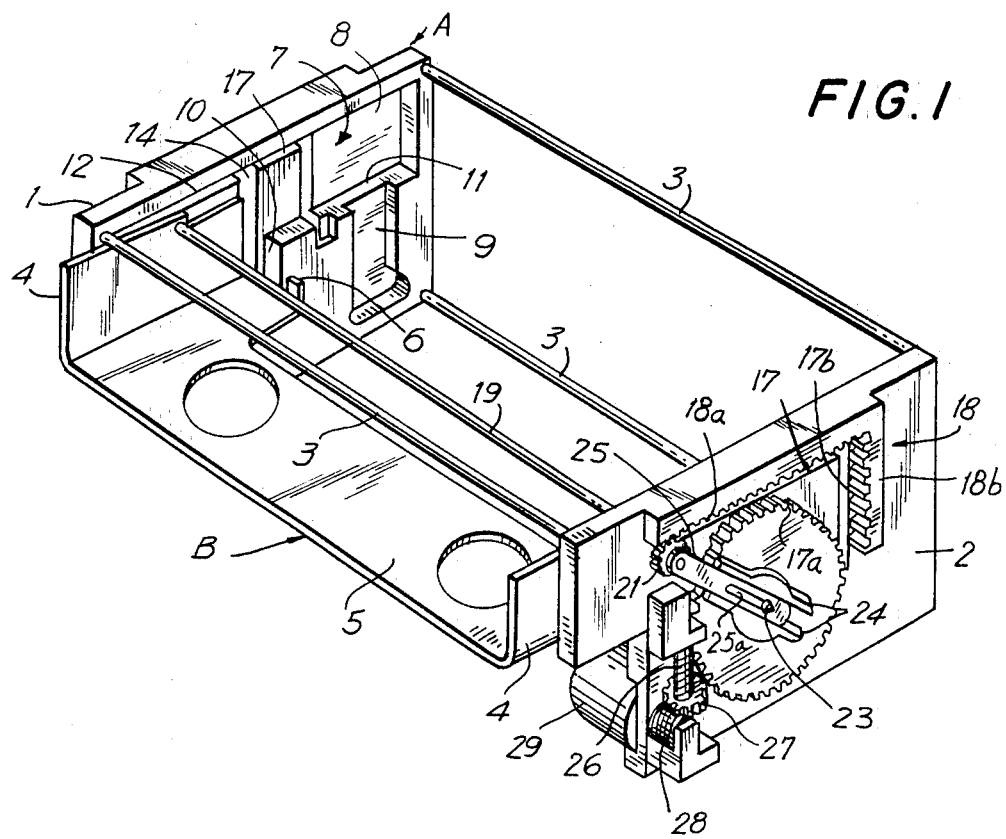
FIG. 1 is a perspective view showing a cassette transporting device of the present invention in which a cassette support is in position for loading a cassette.
Figure 2:
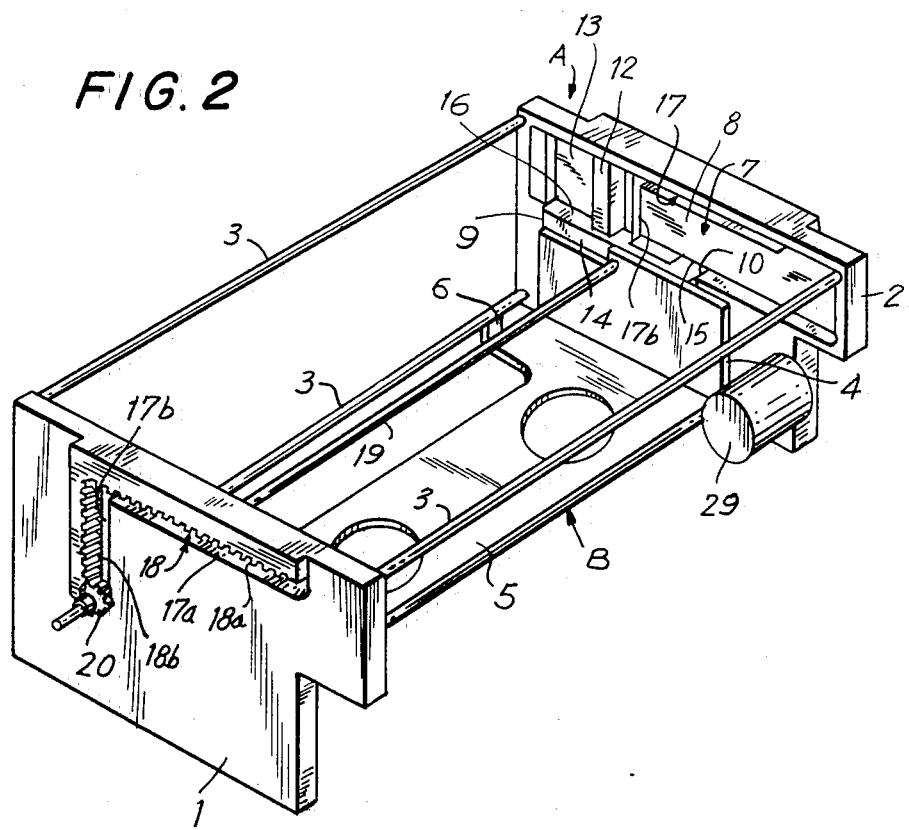
FIG. 2 is a perspective view showing the cassette support in an operative position as it is seen in a different direction from FIG. 1.
Figure 3:
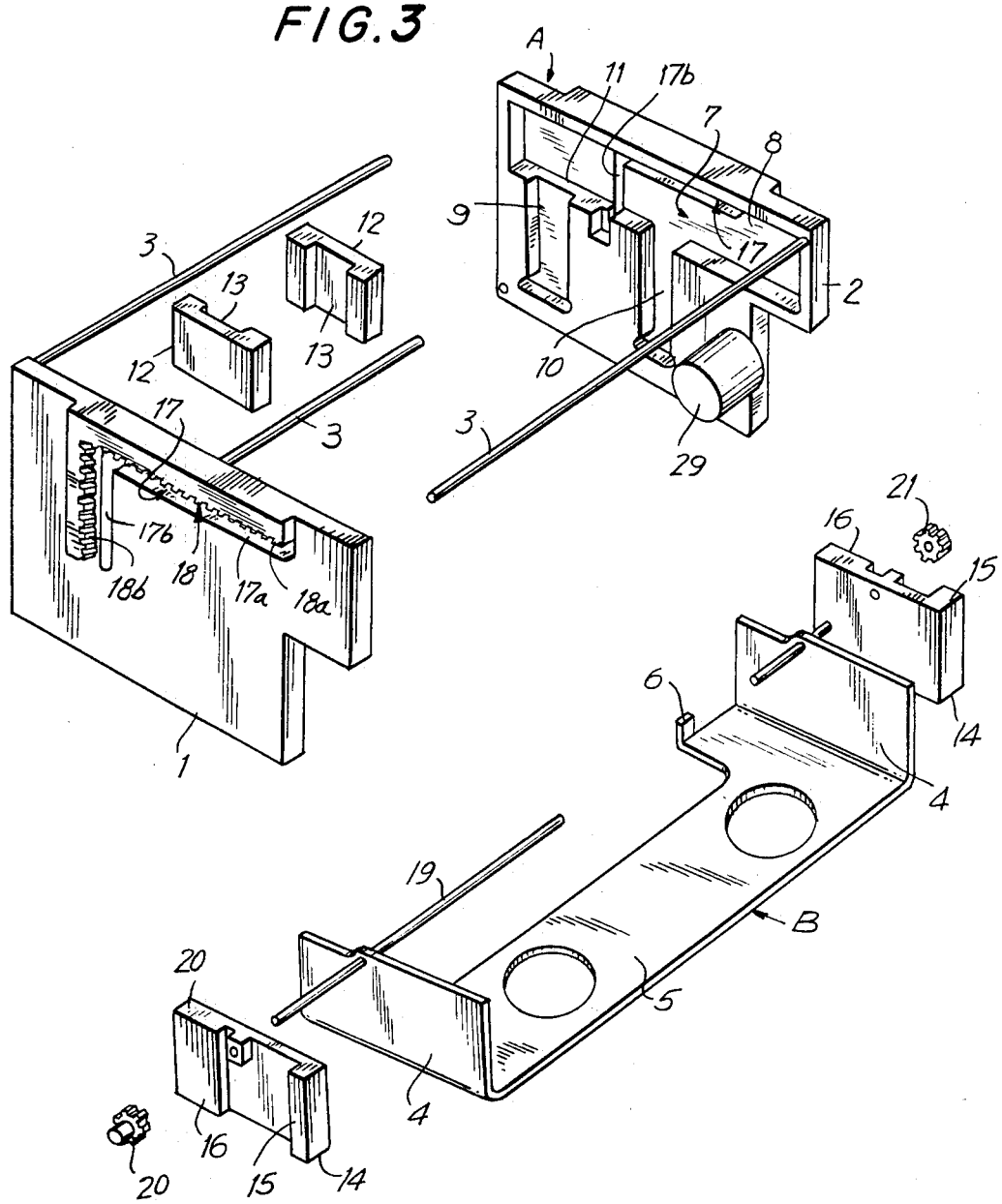
FIG. 3 is an exploded perspective view of the device.
Figure 4:
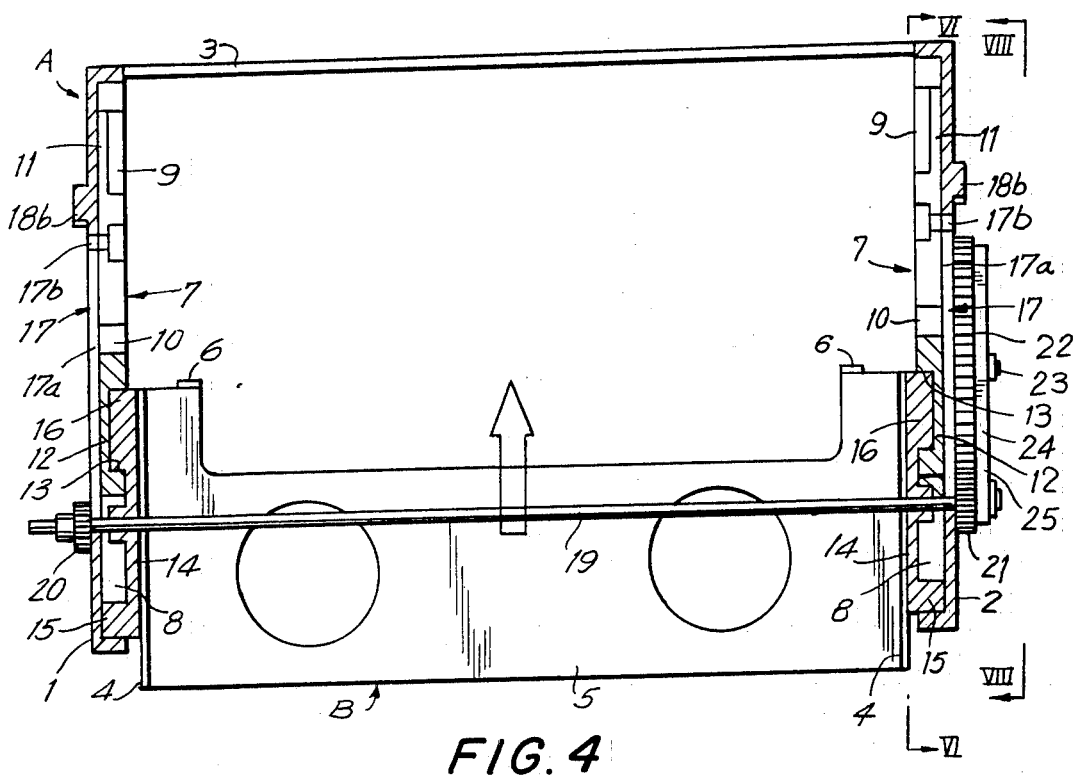
FIG. 4 is an enlarged cross sectional view showing the same when the cassette support is in the same position as in FIG. 1.
Figure 5:
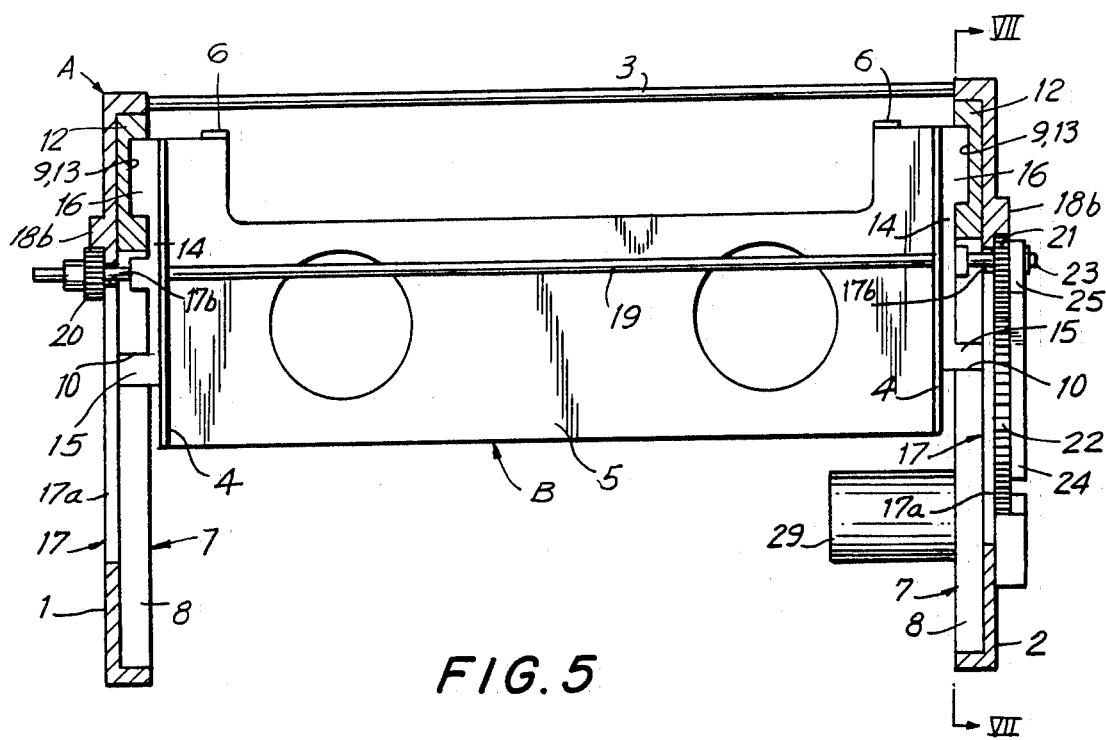
FIG. 5 is an enlarged cross sectional view showing the same when the support is in the same position as in FIG. 2.
Figure 6:
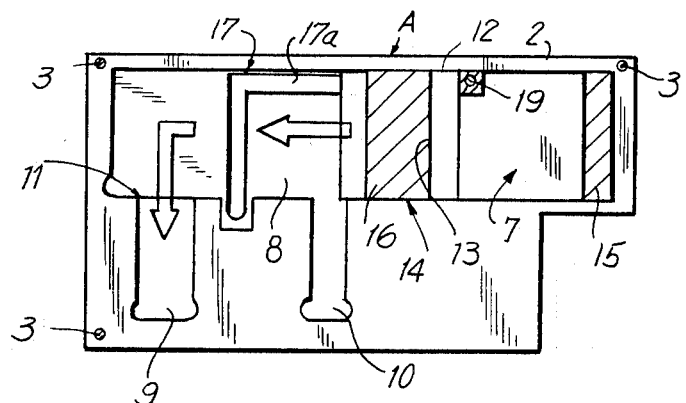
FIG. 6 is a side elevation in vertical section taken along the line VI—VI in FIG. 4.
Figure 7:
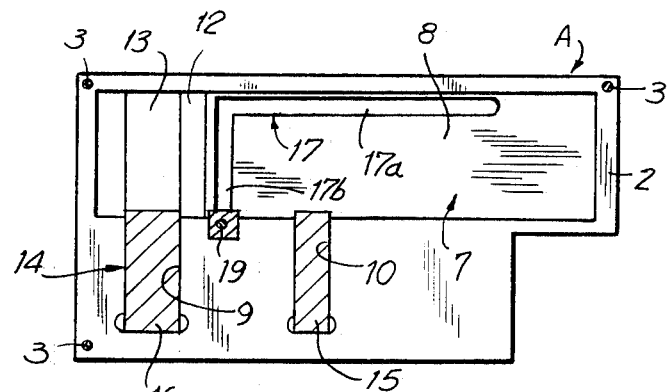
FIG. 7 is a side elevation in vertical section taken along the line VII—VII in FIG. 5.

A cassette frame A comprises opposite side walls 1, 2 made of plastics or the like and connected together by connecting rods 3 (or by a top plate). The frame A is secured, for example, to the base plate of the main body of a magnetic record reproducing apparatus (not shown), with its front side opposed to a cassette inlet formed in the front side of the main body. A cassette support B is in the form of a U-shaped frame comprising opposite side plates 4, 4 and a bottom plate 5. Upright stoppers 6, 6 are formed at opposite sides of the rear end of the bottom plate 5 for preventing a cassette from rearward displacement from its accommodated position. The cassette support B is supported between the side walls 1, 2 of the cassette frame A and movable along the frame A from a loading position to an operative position and vice versa while carrying the cassette inserted from the inlet. Guide means for guiding the cassette support B along the frame A will be described first.

A stationary guide groove 7 is formed in the inner surface of each of the side walls 1, 2 of the cassette frame A. The guide groove 7 comprises a horizontal groove portion 8 formed in an upper portion of the side wall 1 (2) and extending in a front-to-rear direction approximately over the entire length of the side wall, and rear and front vertical groove portions 9, 10 extending continuously downward from a rear end portion and intermediate portion of the horizontal groove portion 8 respectively. Of these two groove portions 9, 10, the rear groove portion 9 is made shallower than the horizontal groove portion 8, whereby a stepped portion 11 is formed at the boundary between the horizontal groove portion rear end and the rear vertical groove portion 9.

Movable guide members 12, 12, each in the form of a rectangular thick plate and made of plastics or the like, are forwardly and rearwardly slidably fitted in the horizontal groove portions 8, 8 of the stationary guide grooves 7, 7. Each movable guide member 12 has a front-to-rear width which is larger than the width of the front vertical groove portion 10 and is therefore prevented from moving from the horizontal groove portion 8 to the front groove portion 10. Further it is prevented from moving into the rear vertical groove portion 9 by the stepped portion 11. Thus the member 12 is slidingly movable only along the horizontal groove portion 8. The movable guide member 12 is formed centrally in its inner surface with a vertical groove 13 having the same width as the rear vertical groove portion 9. When the guide member 12 stops at the rear end of the horizontal groove portion 8, the vertical groove 13 communicates with the rear vertical groove portion 9 vertically in register.

On the other hand, guided plates 14, 14 made of plastics or the like are attached to the outer surfaces of the side plates 4, 4. The guided plate 14 is integrally formed on its outer surface with front and rear projections 15, 16 slidably fittable in the stationary groove 7 of the frame A. The front projection 15 is fitted directly in the horizontal groove portion 8, while the rear projection 16 is fitted in the vertical groove 13 of the movable guide member 12 slidably fitted in the groove portion 8. Thus, the guided plate 14 is adapted to move with the movable guide member 12 along the horizontal groove portion 8 of the guide groove 7. After the guide member 12 has stopped at the rear end of the horizontal groove portion 8 while moving rearward, the front projection 15 is movable into the front vertical groove portion 10, and the rear projection 16 into the rear vertical groove portion 9 along the vertical groove 13 of the guide member 12 at a stop to render the guide plate 14 movable downward. The plate 14 and the member 12 are reversely movable forward. Accordingly by being thus guided by the stationary guide grooves 7, 7, movable guide members 12, 12 and guided plates 14, 14, the cassette support B is movable horizontally rearward from the loading position and then vertically movable downward to the operative position. For the ejection of the cassette, the support B moves reversely to the loading position.

Drive means for moving the cassette support B in the above mode will now be described.

An L-shaped aperture 17 including a horizontal portion 17a and a vertical portion 17b continuously extending downward from the rear end of the horizontal portion 17a is formed in the bottom wall of the horizontal groove portion 8 of the guide groove 7 formed in each side wall 1 (2) of the cassette frame A. Provided on the outer surface of each frame side wall is an L-shaped rack 18 extending along the aperture 17 and comprising a horizontal portion 18a and a vertical portion 18b along the upper edge of the horizontal aperture portion 17a and along the rear edge of the vertical aperture portion 17b respectively. The rack 18 is usually made in the form of a projection integrally with the outer surface of the frame side wall as illustrated, but may be made separately from the wall and secured in place by adhesion or screws.

Approximately at the midportion of the front-to-rear width of the cassette support B, a coupling rod 19 is rotatably supported by the upper ends of the side walls 4, 4 and extends through the side walls and the guided plates 14, 14. The opposite ends of the coupling rod 19 further extend through the apertures 17 of the cassette frame A and project outward from the side walls 1, 2 of the frame. Pinions 20, 21 mounted on the projecting ends are rotatable with the rod 19 and in mesh with the racks 18, 18 on opposite sides of the frame A. Of these pinions 20, 21, the right pinion 21 is coupled to a drive assembly (the main mechanism of the drive means) provided on the right side wall 2 of the cassette frame to serve as a drive pinion, such that the rotation of the drive pinion 21 is delivered to the left driven pinion 20 through the coupling rod 19.

To describe the drive assembly, a worm gear 22 is rotatably supported by a shaft 23 on the outer surface of the frame right side wall 2. A pair of drive arm guides 24, 24 extends on the outer side of the worm gear 22 diametrically thereof, with the shaft 23 interposed therebetween. A drive arm 25 is slidably engaged in the space between the two guides 24, 24. The drive arm 25 has a a slit 25a extending longitudinally thereof and having the shaft 23 of the worm gear 22 engaged therein, whereby the drive arm 25 is made slidable diametrically of the worm gear 22 within the range of the length of the slit 25a. The forward end of the drive arm 25 is connected to the right end of the coupling rod 19 carrying the drive pinion 21 to transmit the torque of the drive assembly to the drive pinion 21 through the arm 25. The worm gear 22 is coupled to the rotary shaft of a reversible motor 29 by an intermediate worm gear mechanism comprising a worm 26, a worm gear 27 and a worm 28.

Figure 8:
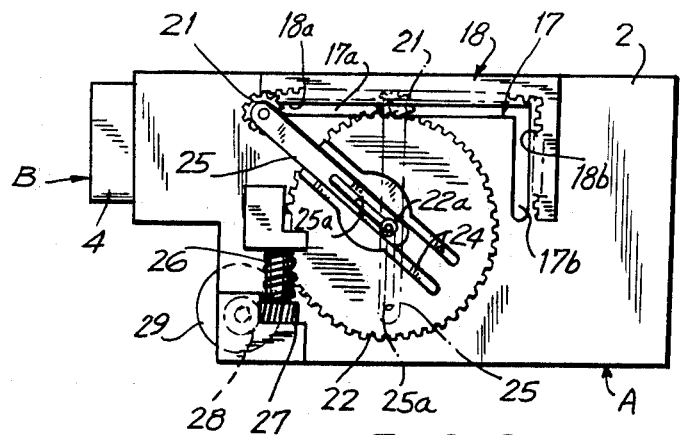
FIG. 8 is a side elevation as the device is seen in the direction of the line VIII—VIII in FIG. 4.

The device described above operates in the following manner. When the cassette support B is in the loading position, the drive and driven pinions 21 and 20 are in engagement with the front ends of the horizontal portions 18a, 18a of the racks 18, 18. In this state, the motor 29 is driven forward, whereupon the torque is delivered to the worm gear 22 through the intermediate worm gear mechanism to rotate the worm gear 22 and the drive arm 25 clockwise in FIG. 8. With the rotation of the drive arm 25, the drive pinion 21 rotates and moves rearward in mesh with the horizontal rack portion 18a. At the same time, the rotation of the drive pinion 21 is transmitted to the driven pinion 20 through the coupling rod 19. Thus, the pinions 21 and 20 move along the horizontal rack portions 18a and further along the vertical rack portions 18b while rotating in synchronism, whereby the cassette support B is moved along the frame A horizontally rearward and then vertically downward to the operative position while being guided by the guide means as already stated. For the ejection of the cassette, the motor 29 is driven reversely to move the drive and driven pinions 21, 20 in the reverse direction along the racks 18, whereby the cassette support B is returned from the operative position to the loading position. While rotating with the worm gear 22, the drive arm 25 slidingly moves diametrically of the worm gear 22 outward or rearward in accordance with the movement of the drive pinion 21 along the rack 18.

The guide means and the drive means of the cassette transporting device of the present invention has the following advantages.

First with the guide means, the projections 15, 16 of the guided plates 14, 14 on the cassette support B, and the movable guide members 12, 12 serving as intermediate members are forwardly or rearwardly slidably fitted in the horizontal groove portions 8 of the stationary guide grooves 7, 7 formed in the cassette frame A, whereby the plates and the guide members are made slidable by face-to-face contact over a large area at vertically opposed portions. Accordingly while moving horizontally along the horizontal groove portions 8, the cassette support B will not tilt upward or downward or laterally, or deflect sidewise in the horizontal position or rattle along forward or rearward, hence smooth and stable horizontal movement. Further when the guided plates 14 are to be moved from the horizontal groove portions 8 into the vertical groove portions 9, 10, the rear projections 16 of the guided plates 14 are led into the rear vertical groove portions 9 along the vertical grooves 13 of the guide members 12 which are stopped at the rear ends of the horizontal groove portions 8, so that the rear projections 16 are movable into the rear vertical groove portions 9 very smoothly. Thus the guide members are not moved vertically unlike the conventional ones, but the guided plates 14 are vertically moved along the vertical grooves 13 of the movable guide members 12 and vertical groove portions 9, 10 which are stationary guide grooves. This enables the cassette support B to vertically move stably as in the horizontal movement. Further for example when the movable guide members 12 are omitted, with each rear projection 16 adapted to move directly into the rear vertical groove portion 9, the projection 16 will temporarily have no support at the corner where the projection 16 is turned from the horizontal groove portion 8 toward the rear vertical groove portion 9. It is then likely that the guided plate 14, i.e., the cassette support B, will tilt rearwardly downward or will not move to the vertical groove portion 9 smoothly. The present arrangement is free of such a likelihood. The present invention assures exactly the same advantages as above when the cassette support B is moved from the operative position to the loading position.

Accordingly the present guide means, although simple in construction, ensures at all times smooth, stable and proper transport of the cassette from the loading position to the operative position and vice versa.

With the drive means, on the other hand, the drive pinion 21 for giving a moving force to the right side of the cassette support B and the driven pinion 20 for giving a moving force to the left side thereof are directly connected by the coupling rod 19 so that the torque delivered from the motor 29 to the drive pinion 21 through a drive assembly is transmitted directly to the driven pinion 20 as a drive force. Accordingly the drive assembly needs to be installed only for the drive pinion 21 as already described and illustrated. As compared with the conventional structure wherein the motor only can be single in number but an independent drive assembly must be provided on each side of the cassette frame, the drive means can be much simpler in overall construction and exceedingly smaller in the number of components as well as in the number of assembling steps. Whereas the conventional arrangement has the likelihood that the two drive assemblies will not always operate in accurate synchronism due to differences in precision therebetween or improper operation of one of the assemblies, the use of single drive assembly eliminates such a likelihood.

According to the foregoing embodiment wherein the pinions 21, 20 are used as drive and driven moving members, and the racks 18, 18 as guide paths for the moving members, the opposite side portions of the cassette support can be travelled in synchronism more properly since the moving members involve no likelihood of slipping. However, the contemplated objects of the invention can be achieved fully even when the pinions 21, 20 are repalced by rollers and the racks 18, 18 by guide rails for rollingly guiding the rollers. While the specific construction of the drive assembly for the drive moving member according to the foregoing embodiment can be suitably modified, the construction of the embodiment has the advantage that since the drive arm 25 for transmitting the torque of the motor 29 to the drive pinion 21 is slidable diametrically of the worm gear 22 outward or inward with the movement of the pinion 21 while rotating with the worm gear, the space required for the rotation of the drive arm 25 can be small. Furthermore, the drive moving member and the drive assembly may be disposed on the left side of the casset frame in reverse relation to the foregoing arrangement.

In the case of the guide means of the above embodiment, the guide plates 14, 14 having projections 15, 16 slidably fitting in the stationary guide grooves 7, 7 of the cassette frame A are fixed to the outer surfaces of the side walls 4, 4 of the cassette support B. However, the cassette support B may be formed with plastics, with the guide projections formed on the outer surfaces of the side walls of the support integrally therewith.

Further according to the above embodiment in which each side wall of the cassette frame has front and rear vertical groove portions in combination with front and rear two guided projections formed on the cassette support and fitting in the vertical groove portions, the cassette support can be supported in good balance and is therefore vertically movable with improved stability. However, only one vertical groove portion as well as only one guided projection may be provided on each side insofar as the support is vertically movable in balance.

The cassette transporting device of the invention is simple in construction in that it merely has stationary guide grooves formed in the cassette frame, and movable guide members and guided projections on the cassette support which are fitted in the guide grooves, and yet the cassette can be transported by this arrangement from a loading position to an operative position stably, smoothly and reliably at all times without any tilting, sidewise deflection or backlash. The device is therefore useful for magnetic record reproducing apparatus of the cassette front loading-unloading type, contributing a great deal to the improvement of reliability in loading and unloading the cassset.

Thus the present device has various advantages in use.

What is claimed is:

1. A cassette transporting device for transporting a cassette between a loadinig position and an operating position, comprising:

a cassette frame adapted to be connected to a magnetic recording and reproducing apparatus and including at least two spaced, opposed side walls connected to each other, each side wall having inner and outer surfaces, guide means symmetrically arranged in the inner surfaces of the opposed side walls of the cassette frame, said guide means including at each inner surface of the side wall a horizontal groove, and at least one vertical groove communicating with and extending downwardly from the horizontal groove, said at least one vertical groove having a depth shallower than the depth of the horizontal groove, movable guide members slidably situated in the respective horizontal grooves, each movable guide member having a vertical guide groove with a depth equal to that of the at least one vertical groove in the side walls, a cassette support situated inside the cassette frame and adapte to receive a cassette therein, said cassette support having side plates facing the side walls of the cassette frame respectively, and at least one guided projection extending outwardly from the respective side plates and engaging either the vertical guide groove of the movable guide member of the at least one vertical groove of the side wall so that when the at least one guided projection is engaged with the vertical guide groove of the movable guide member, the movable guide member will be received in the horizontal groove to allow the cassette support to move along the horizontal groove, and when the at least one guided projection of the cassette support is positioned above the at least one vertical groove of the side wall, the at least one guided projection will slide onto the at least one vertical groove of the side wall to allow the cassette support to move along the at least one vertical groove of the side wall, and drive means for moving the cassette support along the guide means between the loading position and operating position, said drive means including apertures formed in the respective side walls of the cassette frame to extend along the horizontal groove and the at least one vertical groove of the side walls, drive guides formed on the respective outer surfaces of the side walls of the cassette frame along the apertures, a drive member extending through the apertures of the drive means and the side plates of the cassette support and engaging the drive guides, a drive assembly connected to the drive member to move the drive member along the apertures, and a motor to actuate the drive assembly so that when the motor is actuated, the cassette support moves between the loading position and the operating position.

2. A cassette transporting device according to claim 1, in which said at least one vertical groove of the guide means includes first and second vertical grooves, the depth of the first vertical groove being the same as that of the horizontal groove and the depth of the second vertical groove being shallower than that of the horizontal groove, said at least one guided projection of the cassette support including first and second guided projections, said first guided projection extending outwardly longer than the second guided projection so that when the second guided projection is engaged with the vertical guide groove of the movable guide member, the first guided projection and movable guide member can be slidably situated in the horizontal groove, the first and second guided projections being able to slide onto the first and second vertical grooves when the first and second guided projections of the cassette support are positioned above the first and second vertical grooves.

3. A cassette transporting device according to claim 2, in which said cassette support further includes guide plates situated outside the side plates, said guide plates and side plates being connected together by means of the drive member, said first and second guided projections being formed on the guide plates respectively.

4. A cassette transporting device according to claim 3, in which each drive guide is integrally formed on the side wall of the cassette frame to extend outwardly therefrom and includes a rack at a side facing to the aperture.

5. A cassette transporting device according to claim 4, in which said drive member comprises a rod passing through the aperatures of the side walls of the cassette frame and through the guide plates and side plates of the cassette support, and pinions connected to the rod, said pinions being situated outside the side walls of the cassette frame and engaging the racks of the drive guide.

6. A cassette transporting device according to claim 5, in which said drive assembly comprises a worm gear rotationally connected to one of the two side walls of the cassette frame, a drive arm having an end rotationally connected to one of the pinions of the drive member and slidably retained outside the worm gear so that when the worm gear is rotated, the drive arm is slidably rotated together with the worm gear, and gear members situated between the worm gear and the motor, whereby when the motor is actuated, the worm gear rotates to thereby move the drive member along the apertures of the side walls.

* * * * *